US006427036B1

(12) United States Patent
Weverka

(10) Patent No.: US 6,427,036 B1
(45) Date of Patent: Jul. 30, 2002

(54) FIBER OPTIC INTERFEROMETER BASED SWITCH

(75) Inventor: Robert T. Weverka, San Mateo, CA (US)

(73) Assignee: ONI Systems Corp., San Jose, CA (US)

( * ) Notice: Subject to any disclaimer, the term of this patent is extended or adjusted under 35 U.S.C. 154(b) by 0 days.

(21) Appl. No.: 09/224,636

(22) Filed: Dec. 31, 1998

(51) Int. Cl.[7] ................................................. G02B 6/26
(52) U.S. Cl. .......................................... 385/16; 385/17
(58) Field of Search ............................... 385/16, 17, 15; 356/477

(56) References Cited

U.S. PATENT DOCUMENTS

| 4,477,723 A | | 10/1984 | Carome et al. ............. 250/227 |
| 4,560,234 A | | 12/1985 | Shaw et al. ............... 350/96.15 |
| 4,772,083 A | | 9/1988 | Ahmed .................... 350/96.14 |
| 4,893,930 A | * | 1/1990 | Garrett et al. ............. 356/345 |
| 4,929,830 A | | 5/1990 | Bohnert et al. ......... 250/227.14 |
| 5,369,485 A | * | 11/1994 | Hofler et al. ............... 356/345 |
| 5,383,048 A | | 1/1995 | Seaver ...................... 359/279 |
| 5,502,781 A | | 3/1996 | Li et al. ........................ 385/4 |
| 5,920,666 A | * | 7/1999 | Digonnet et al. ............. 385/16 |
| 5,969,342 A | * | 10/1999 | Feng et al. ............. 250/227.14 |

FOREIGN PATENT DOCUMENTS

GB        2 211 956 A   * 12/1989

* cited by examiner

Primary Examiner—Frank G. Font
Assistant Examiner—Phil Natividad
(74) Attorney, Agent, or Firm—Lumen Intellectual Property Services, Inc.

(57) ABSTRACT

A fiber optic switch based on a Mach-Zender type interferometer comprises first and second input optical fibers, first and second intermediate optical fiber segments, and first and second output optical fibers. The switch selectively couples the first and second input fibers either to the first and second output fibers, respectively, or to the second and first output fibers, respectively. To operate the switch, an optical path length of the first intermediate fiber segment is changed, and an optical path length of the second intermediate fiber segment is altered by an equal and opposite amount. Heat is therefore deposited equally in each of the intermediate fiber segments. The intermediate fiber segments lie substantially in a plane, thereby ensuring that the polarization of light traveling through the first intermediate fiber segment does not rotate significantly relative to the polarization of light traveling through the second intermediate fiber segment.

18 Claims, 2 Drawing Sheets

FIBER OPTIC INTERFEROMETER BASED SWITCH

FIELD OF THE INVENTION

The present invention relates to optical switches for fiber optic systems, and in particular to a two-input, two-output device for controllably coupling light from a first input optical fiber to either of two output optical fibers.

BACKGROUND

Mach-Zender type interferometers are often used to construct optical devices. In a Mach-Zender interferometer, input light is divided into two light beams. The beams travel along two parallel intermediate paths and are then recombined and allowed to interfere. A switch based on this interferometer has two output paths. The interference of the light from each of the two intermediate paths determines which output path the light takes.

One such switch has two inputs and two outputs. Light from the first input is divided into two portions, half taking the first intermediate path and half taking the second intermediate path. When the two intermediate paths rejoin, the light from the first input interferes constructively at one of the outputs and destructively at the other output. The light from the first input is thereby coupled to only one of the outputs. Typically light from the second input is similarly coupled to the other output.

To operate the switch, the output that receives the light from the first input is selected by controllably changing the difference between the optical path lengths of the two intermediate paths, thereby changing the interference conditions at the two outputs. In an "off" position, light entering the switch through the first and second inputs is coupled to the first and second outputs, respectively. In the "on" position, light from the first and second inputs is coupled to the second and first outputs, respectively.

In a number of prior art optical switches, the intermediate paths exist within a bulk material. A switch having fiber optics coupled to a bulk material has the following disadvantages: some light is lost in the coupling between the different materials, the switch is sensitive to temperature changes due to the unequal thermal properties of the dissimilar materials, and the switch is bulky and expensive. For use in fiber optic systems, therefore, it is desirable to make the switch entirely of fiber optic components.

U.S. Pat. No. 5,383,048 by Seaver and U.S. Pat. No. 4,772,083 by Ahmed show optical systems using a Mach-Zender type interferometer. However, these devices do not have two inputs and two outputs, and are not made entirely of fiber optic components.

U.S. Pat. No. 5,502,781 by Li et al. shows a two-input, two-output switch, but the switch is not constructed entirely of fiber optic components.

In U.S. Pat. No. 4,929,830, Bohnert et al. use a Mach-Zender interferometer as an electric field sensor. The device does not have two inputs and two outputs, is not made entirely of optical fibers, and is not used as a switch. U.S. Pat. No. 4,477,723 by Carome et al. also discloses an electric field sensor using a Mach-Zender interferometer. This sensor has two inputs and two outputs, and is made of fiber optic components; however, the device is not used as a switch.

U.S. Pat. No. 4,560,234 by Shaw et al. discloses a two-input, two-output fiber optic switch based on a Mach-Zender interferometer. The optical fiber that defines the first intermediate path is wrapped around a cylindrical piezo-electric crystal. The crystal is used to stretch the fiber, thereby changing its optical path length with respect to the second intermediate path, whose length remains stationary.

The switch of Shaw et al. also includes a polarization controller in the first intermediate path to ensure that the polarization of light traversing the first intermediate path remains parallel to the polarization of light taking the second intermediate path. Such polarization control is needed because the interference conditions that allow the switch to function require that the light from the two intermediate paths have the same polarization. As is well known, two light beams will not interfere if their polarizations are perpendicular.

The switch of Shaw et al., however, suffers from the following two disadvantages. First, the inclusion of the polarization controller makes the switch excessively bulky. Second, the piezo-electric device deposits heat into the first intermediate fiber, thereby changing its optical path length. The interference relationship between the two intermediate paths therefore changes with time, resulting in a change in the voltages that need to be supplied to the piezo-electric crystal to achieve the "on" and "off" positions. An elaborate feedback mechanism must therefore be connected to the switch outputs and to the piezo-electric crystal to determine the required voltages.

OBJECTS AND ADVANTAGES

It is therefore a primary object of the present invention to provide a two input, two output fiber optic switch that does not require a polarization controller. It is another object to provide a switch having the property that the voltages used to turn the switch "on" and "off" are approximately constant in time.

The invention has the advantage that it provides a compact and inexpensive fiber optic switch. The invention has the further advantage that it has a simple design, since no complicated feedback mechanism needs to be used to monitor the voltages necessary to reach the "on" and "off" positions.

SUMMARY

An optical switch having fiber optic components is described. The switch comprises first and second input optical fibers, first and second intermediate optical fiber segments, and first and second output optical fibers. The input optical fibers are coupled to the intermediate optical fiber segments by a first optical coupler. The intermediate optical fiber segments are also coupled to the output optical fibers by a second optical coupler. The switch therefore comprises a Mach-Zender type interferometer.

The first and second intermediate optical fiber segments have first and second optical path lengths, respectively. The difference, $\Delta l$, between the first and second optical path lengths is controllably altered. In the preferred embodiment, first and second piezo-electric plates are attached to the first and second intermediate fiber segments, respectively. The piezo-electrical plates are used to alter the optical path length difference $\Delta l$.

Light having a vacuum wavelength $\lambda$ enters the switch through at least one of the input fibers. The light is divided between the intermediate fiber segments by the first optical coupler. The light traveling through the first intermediate fiber segment then interferes with the light traveling through the second intermediate fiber segment within the second optical coupler. The optical path length difference $\Delta l$ is controllably altered to selectively couple the first and second input fibers either to the first and second output fibers, respectively, or to the second and first output fibers, respectively.

In the preferred embodiment, the optical path length difference $\Delta l$ is altered by increasing the optical path length of the first intermediate fiber segment by an amount $d_1$ and decreasing the optical path length of the second intermediate fiber segment by an amount $d_2$. It is preferred that $d_1=d_2=d$, so that equal amounts of heat are deposited in the first and second intermediate fiber segments. In this embodiment the change in $\Delta l$ needed to flip the switch from an "off" position to an "on" position, or from the "on" position to the "off" position, does not change in time since the operation of the switch warms both of the intermediate fiber segments equally.

In the preferred embodiment, the first and second intermediate fiber segments lie substantially in a plane. Because of the planar geometry, the polarization of the light traveling through the first intermediate fiber segment does not rotate significantly with respect to the polarization of the light traveling in the second intermediate fiber segment. Therefore the interference that causes the switch to function is maintained, and no polarization controller is necessary. In one embodiment, the relative rotation between the polarizations of the light traveling in the first and second intermediate fiber segments, respectively, is further reduced by annealing the intermediate fiber segments after assembly.

In one embodiment, a pressure device is provided to apply pressure to one of the intermediate fiber segments, thereby producing a change in the optical path length of the intermediate fiber segment due to the transverse photoelastic effect. An offset in $\Delta l$ is therefore created, so that the switch maintains a desired default position when no voltage is supplied to the piezo-electric plates.

DETAILED DESCRIPTION

Figure 1:
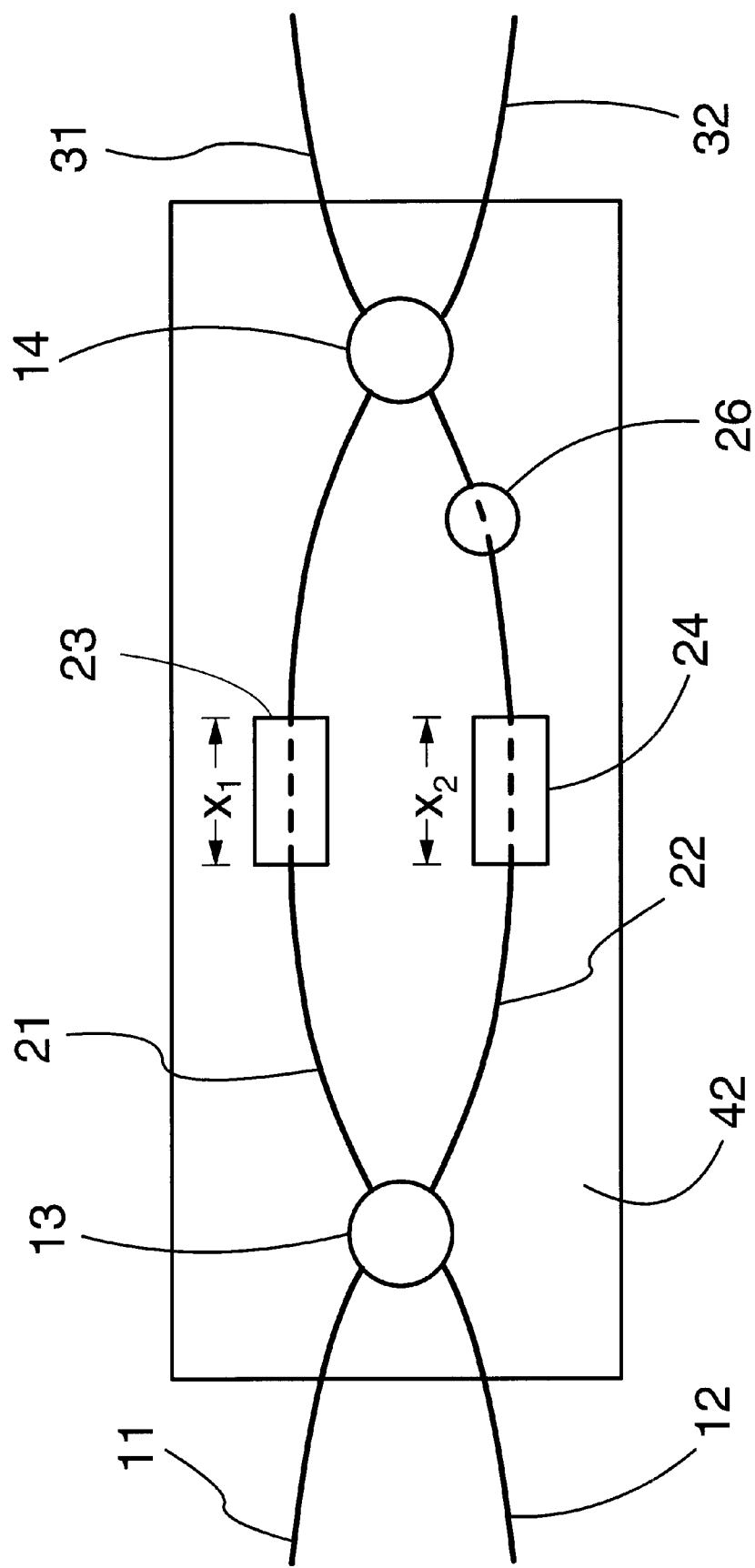
FIG. 1 shows a first embodiment of a fiber optic interferometer based switch.

An interferometer based fiber optic switch is shown in FIG. 1. The switch has two input optical fibers 11 and 12, two intermediate optical fiber segments 21 and 22, and two output optical fibers 31 and 32.

Input fibers 11 and 12 are joined to intermediate fiber segments 21 and 22 by an optical coupler 13. Optical coupler 13 transfers 50% of the intensity of light received from input fiber 11 to each of the intermediate fiber segments 21 and 22. Similarly, half of the light received through input fiber 12 is coupled to intermediate fiber segment 21, and half is coupled to intermediate fiber segment 22.

An optical coupler 14 couples intermediate fiber segments 21 and 22 to output fibers 31 and 32. In the preferred embodiment, optical coupler 14 is identical to optical coupler 13. Optical coupler 14 divides an intensity of light traveling through intermediate fiber segment 21 equally among output fibers 31 and 32. Light from intermediate fiber segment 22 is also evenly divided among output fibers 31 and 32.

Optical couplers 13 and 14 preferably have mirror symmetry and maintain the optical fibers in a plane. These properties prevent the polarization of light passing through the couplers from rotating. The optical couplers may be, for example, fused couplers or polished couplers; fused couplers are preferred since they have a lower cost and a lower light loss. The optical couplers are described in, for example, U.S. Pat. No. 4,560,234 by Shaw et al., and are commercially available from Gould Fiber Optics and from Alliance Fiber Optics.

A piezo-electric plate 23 is attached to intermediate fiber segment 21 using epoxy or other adhesive. Similarly, a piezo-electric plate 24 is attached to intermediate fiber segment 22. In the preferred embodiment, plates 23 and 24 are identical.

Optical couplers 13 and 14 are mounted on a flat mounting surface 42 by glue, tape, or any other permanent or removable adhesive. Mounting surface 42 is a surface of a substrate that comprises any material that is rigid. The substrate may be made from, for example, metal, plastic, wood, or cardboard. In the preferred embodiment, intermediate fiber segment 21 lies between plate 23 and mounting surface 42, as illustrated by a dashed line in FIG. 1. Similarly, intermediate fiber segment 22 is sandwiched between mounting surface 42 and plate 24.

Intermediate fiber segment 21 has an optical path length $l_1$, and intermediate fiber segment 22 has an optical path length $l_2$. The difference $\Delta l$ between the two optical path lengths is defined as: $\Delta l = l_1 - l_2$. In the preferred embodiment, light entering the switch through input fibers 11 and 12 is monochromatic, having a vacuum wavelength $\lambda$.

To demonstrate the operation principles of the switch, an example is first considered where input light is incident only through input fiber 11. The input light is transmitted to intermediate fiber segments 21 and 22 by optical coupler 13. As is well known in the art, optical coupler 13 gives the light traveling through intermediate fiber segment 22 a 90 degree phase shift with respect to the light traveling through intermediate fiber segment 21.

The light traveling through intermediate fiber segments 21 and 22 is then coupled to output fibers 31 and 32. Light traveling through intermediate fiber segment 22 acquires an additional 90° phase shift when transmitted to output fiber 31 through optical coupler 14. Therefore, if the difference between the optical path lengths of the two intermediate fiber segments, $\Delta l$, is equal to an integral multiple of the wavelength $\lambda$, output fiber 31 receives light from intermediate fiber segment 22 that is 180° out of phase with the light received from intermediate fiber segment 21. The 180° phase shift results in destructive interference, so that no light is transmitted from input fiber 11 to output fiber 31.

On the other hand, light transmitted to output fiber 32 from intermediate fiber segment 21 is given a 90° phase shift by output coupler 14, and light transmitted to output fiber 32 from intermediate fiber segment 22 is given no phase shift by output coupler 14.

Therefore, assuming that $\Delta l = n\lambda$, where n is any integer, all the light entering output fiber 32 is in phase, having received a 90° phase shift either from optical coupler 13 or from optical coupler 14. Therefore all the light from input fiber 11 is transmitted to output fiber 32 due to constructive interference.

In this example, and in the general operation of the switch, the polarization of the light traveling through intermediate fiber segment 21 does not significantly rotate relative to the polarization of the light traveling through intermediate fiber segment 22. This condition on the polarizations is necessary to ensure that the phase shifts discussed above result in the constructive and destructive interference that enable the switch to operate.

This concludes the example. In general, light is incident through both input fibers 11 and 12. In this case, when $\Delta l=n\lambda$, the light entering the switch through input fiber 11 is transmitted to output fiber 32, and the light from input fiber 12 is transmitted to output fiber 31. If the difference between the optical path lengths of the intermediate fiber segments is $(n+\frac{1}{2})\lambda$, where n is any integer, the outputs are reversed: light from input fiber 11 is transmitted to output fiber 31, and light from input fiber 12 is transmitted to output fiber 32.

To operate the switch, the optical path length $\Delta l$ is controllably changed to couple input fibers 11 and 12 selectively to 32 and 31, respectively, or to 31 and 32, respectively. The optical path lengths of the intermediate fiber segments are controlled by piezo-electric plates 23 and 24.

Piezo-electric plates 23 and 24 naturally have lengths $x_1$ and $x_2$, respectively. To change the lengths of plates 23 and 24, voltages are applied to the plates using standard voltage sources, not shown. For the switch to attain a default position, default voltages are applied to the plates to increase the length of plate 23 by an amount $s_1$ and to decrease the length of plate 24 by an amount $S_2$. The optical path length $l_1$ of intermediate fiber segment 21 is thereby increased by an amount $r_1$, where $r_1$ is approximately given by: $r_1 \approx s_1/N_1$, where $N_1$ is the index of refraction of intermediate fiber segment 21. Similarly, the optical path length of intermediate fiber segment 22 is decreased by an amount $r_2$, where $r_2 \approx s_2/N_2$, where $N_2$ is the index of refraction of intermediate fiber segment 22.

The default voltages cause the optical path length difference $\Delta l$ to change by an amount $r_1+r_2$. The default voltages are adjusted so that either $\Delta l=n\lambda$ or $\Delta l=(n+\frac{1}{2})\lambda$, where n is any integer. If $\Delta l=n\lambda$, the default position of the switch is an "off" position, with light from input fiber 11 coupled to output fiber 32, and light from input fiber 12 coupled to output fiber 31. If $\Delta l=(n+\frac{1}{2})\lambda$, the default position of the switch is an "on" position, with light from input fiber 11 transmitted to output fiber 31, and light from input fiber 12 coupled to output fiber 32.

To flip the switch from its default position—i.e., to turn the switch "on" when its default value is "off," and to turn the switch "off" when its default value is "on"—the voltages applied to plates 23 and 24 are altered from their default values to increase the optical path length $l_1$ by an additional amount $d_1$, and to decrease the optical path length $l_2$ by an additional amount $d_2$. The optical path length difference $\Delta l$ is then increased by an additional amount $d_1+d_2$. The applied voltages are adjusted so that $d_1+d_2=(m+\frac{1}{2})\lambda$, where m is any integer. In the preferred embodiment, $d_1+d_2=\lambda/2$.

The condition $d_1+d_2=(m+\frac{1}{2})\lambda$ ensures that a default "off" position is switched "on," and a default "on" position is switched "off." To return the switch to its default position, the voltages applied to plates 23 and 24 are returned to their default values.

In the preferred embodiment, $r_1=r_2$, and $d_1=d_2=\lambda/4$. In this embodiment, the amount of heat deposited in intermediate fiber segment 21 by plate 23 is approximately equal to the amount of heat deposited in intermediate fiber segment 22 by plate 24. Thus, although the indices of refraction $N_1$ and $N_2$ will change as the temperatures of the intermediate fiber segments rise, the changes in $N_1$ and $N_2$ will be nearly equal, so that the phase relationship between the light traveling through intermediate fiber segment 21 and the light traveling through intermediate fiber segment 22 is unaffected.

For the optical path lengths to remain unaffected by the heat deposited in the intermediate fiber segments, it is important that intermediate fiber segments 21 and 22 have equivalent thermal properties. In the preferred embodiment, the two intermediate fiber segments are made of the same material, have equal lengths, and have mirror-symmetrical shapes.

In the preferred embodiment, therefore, the optical path length difference $\Delta l$ does not drift due to thermal effects during the operation of the switch. This means that the values of $r_1$, $r_2$, $d_1$, and $d_2$ required to operate the switch remain constant in time.

In the preferred embodiment, the method of changing $\Delta l$ uses the reciprocal action of changing the length of plate 23 and changing the length of plate 24 by an equal and opposite amount. The switch is therefore insensitive to thermal effects. The voltages applied to plates 23 and 24 to achieve the "on" and "off" positions are constant in time, and no elaborate feedback system is needed in conjunction with the switch to monitor its thermal behavior.

In the preferred embodiment, the switch is enclosed in a casing made of a thermally conductive material, such as aluminum. The casing distributes heat, enabling the intermediate fiber segments to have the same temperature.

As will be appreciated by one skilled in the art, the above embodiment may be varied in many trivial ways. For instance, instead of increasing $l_1$ by an amount $r_1$ and decreasing $l_2$ by $r_2$ to achieve the default position, optical path length $l_1$ may instead be decreased and $l_2$ increased. Similarly, to flip the switch, $l_1$ may be decreased and $l_2$ increased. Such obvious changes do not affect the overall performance of the switch.

Optical couplers 13 and 14 are mounted on mounting surface 42, and intermediate fiber segments 21 and 22 lie approximately on mounting surface 42. The optical couplers and the intermediate fiber segments lie roughly in the plane defined by mounting surface 42. In general, a strain in a material can cause the polarization of light traveling through that material to rotate. However, if the intermediate fiber segments are made of an isotropic material such as glass, the bending strains caused by the circuitous paths that the intermediate fiber segments take in the plane do not alter the polarization of light traveling through the intermediate fiber segments. Therefore the polarization of the light traveling through intermediate fiber segment 21 does not significantly rotate relative to the polarization of the light traveling through intermediate fiber segment 22. Thus the light from the two intermediate fiber segments interferes within optical coupler 14 to make the switch operate efficiently, and no extra polarization controller is needed.

To maintain the interference conditions that enable the switch to operate, the intermediate fiber segments are kept approximately in a plane. In the preferred embodiment, this planarity is achieved by mounting optical couplers 13 and 14 on mounting surface 42. However, other methods that accomplish the same goal will be apparent to one skilled in the art.

In some embodiments, the default position of the switch is achieved without applying any voltage to plates 23 and 24. That is, in these embodiments, $r_1=r_2=0$. In these embodiments, a pressure device 26 is preferably provided. Pressure device 26 applies pressure to one of the intermediate fiber segments, thereby inducing a strain in the intermediate fiber segment and locally changing its index of refraction by the transverse photoelastic effect. Therefore an offset is produced in the optical path length difference $\Delta l$. The pressure applied by pressure device 26 is adjusted until the desired default value of $\Delta l$ is attained. That is, pressure device 26 is adjusted so that either $\Delta l=n\lambda$ or $\Delta l=(n+\frac{1}{2})\lambda$.

In the preferred embodiment, pressure device 26 is a screw mounted on mounting surface 42. The head of the screw overlaps one of the intermediate fiber segments, so that as the screw is tightened, the head of the screw compresses the intermediate fiber segment against the mounting surface.

Because intermediate fiber segments 21 and 22 lie substantially in a plane, the polarization of light traveling in intermediate fiber segment 21 is not significantly rotated with respect to the polarization of light traveling in intermediate fiber segment 22. However, some slight relative rotation is still present, caused by strains occurring in the intermediate fiber segments due to their nonlinear shapes or to twisting of the intermediate fiber segments during manufacture. The strains are diminished, in one embodiment, by annealing intermediate fiber segments 21 and 22 after the switch is constructed. In this embodiment, the relative polarization rotation is practically eliminated, allowing the switch to operate extremely efficiently.

As an example, to be viewed as an illustration and not a limitation, piezo-electric plates 23 and 24 are nearly identical, with their lengths $x_1$ and $x_2$ approximately 2 cm, their widths approximately 0.5 cm, and their thicknesses approximately 0.5 mm. To flip the switch from its default position, approximately 50V is applied to plate 23, and approximately −50V is applied to plate 24. It is preferred that the piezo-electric plates have thicknesses between 0.1 mm and 0.5 mm.

One of the features of the present switch is that the optical path lengths of the intermediate fiber segments are changed in opposite directions, with one optical path length being increased and the other decreased. These complementary changes result in equal amounts of heat being deposited in each of the intermediate fiber segments, thereby ensuring the stability of the switch over time. The changes in optical path lengths are accomplished, in the embodiment of FIG. 1, by piezo-electric plates 23 and 24; however, in general any means for accomplishing the changes can be used. It is only necessary that the optical path lengths be changed in opposite directions, so that equal amounts of heat are deposited in each of the intermediate fiber segments.

Figure 2:
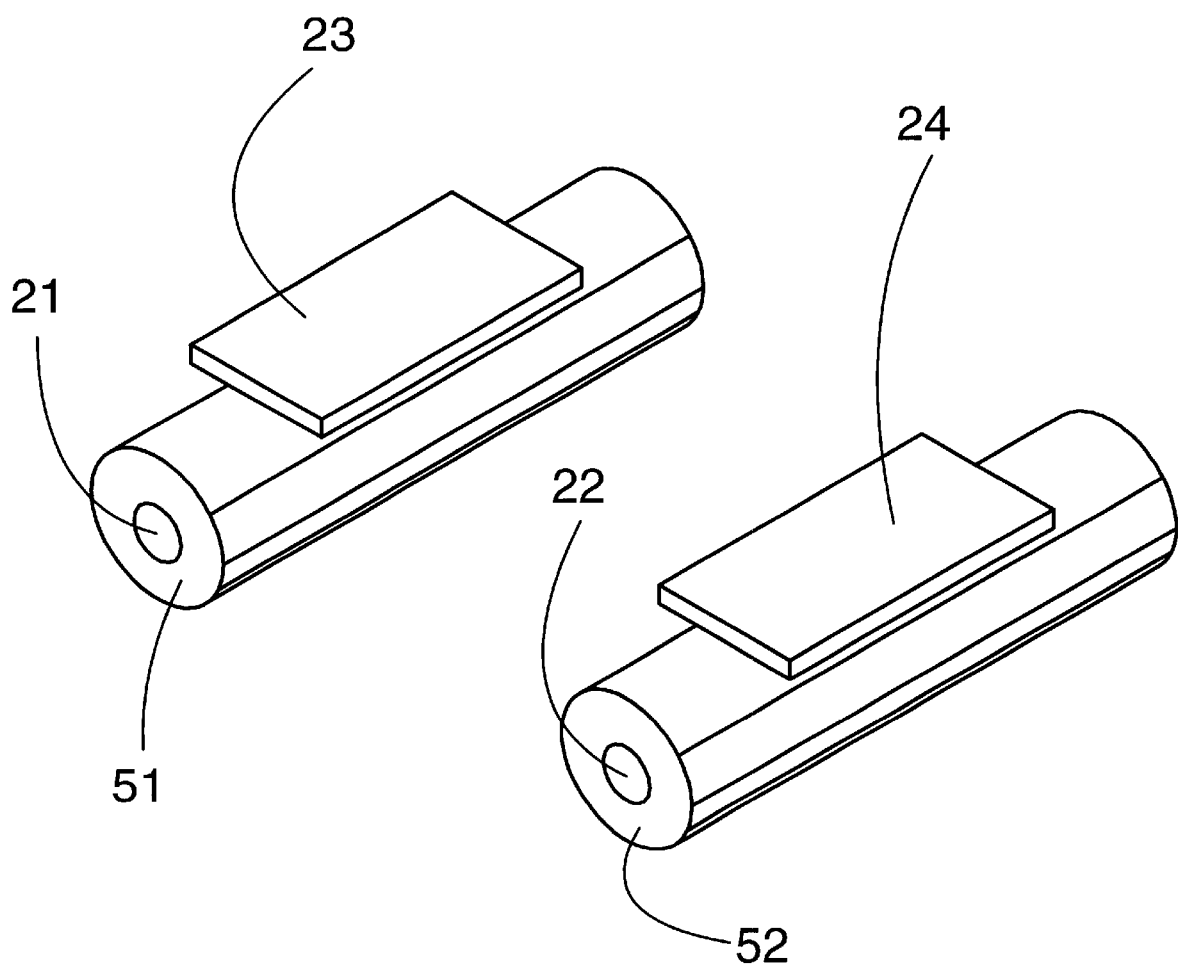
FIG. 2 shows portions of intermediate fiber segments in a second embodiment of the switch.

In some embodiments, intermediate fiber segment 21 is surrounded by a buffer, or sheath 51, as shown in FIG. 2. Sheath 51 is bonded or otherwise attached to intermediate fiber segment 21, and plate 23 is attached to sheath 51. Similarly, intermediate fiber segment 22 is attached to a surrounding sheath 52 that is in turn attached to plate 24. When plates 23 and 24 change in length, sheaths 51 and 52, respectively, are forced to change in length. Each of the sheaths then causes its enclosed intermediate fiber segment to change in length.

I claim:

1. A fiber optic switch comprising:
   a) first and second input optical fibers;
   b) first and second intermediate optical fiber segments having first and second optical path lengths, respectively;
   c) first and second output optical fibers;
   d) a first optical coupler coupling said first and second input optical fibers with said first and second intermediate optical fiber segments;
   e) a second optical coupler coupling said first and second intermediate optical fiber segments with said first and second output optical fibers; and
   f) a means for altering a difference between said first and second optical path lengths; wherein said means for altering the difference between the first and second optical path lengths comprises:
      a first piezoelectric plate attached to the first intermediate optical fiber segment; and
      a second piezo-electric plate attached to the second intermediate optical fiber segment,
   wherein a first voltage is applied to the first piezo-electric plate so as to increase the first optical path length by an amount $d_1$, and a second voltage is applied to the second piezo-electric plate so as to decrease the second optical path by an amount $d_2$, the increase in the optical path difference being $d_1+d_2$, and wherein a change in the first optical path length due to heat deposited in the first intermediate optical fiber segment by the first piezo-electric plate is compensated by a change in the second optical path length due to heat deposited in the second intermediate optical fiber segment by the second piezo-electric plate.

2. The switch of claim 1 wherein $d_1+d_2$ is equal to one half of a wavelength of light input to said first optical coupler through at least one of said input optical fibers.

3. The switch of claim 2, wherein $d_1=d_2$.

4. The switch of claim 1, further comprising first and second sheaths surrounding said first and second intermediate fiber segments, respectively, wherein the first piezo-electric plate is attached to said first sheath, and the second piezo-electric plate is attached to said second sheath.

5. The switch of claim 1, further comprising a means for producing a strain in said second intermediate optical fiber segment, for producing an offset in said difference between said first and second optical path lengths.

6. The switch of claim 1, wherein said first and second intermediate optical fiber segments are annealed.

7. The switch of claim 1 wherein said difference between said first and second optical path lengths causes light entering said second optical coupler from said first intermediate optical fiber segment to selectively interfere with light entering said second optical coupler from said second intermediate optical fiber segment, whereby said second optical coupler selectively supplies a major portion of light input from the first input optical fiber to either the first or the second output optical fiber.

8. The switch of claim 1, wherein said first optical coupler couples 50% of light input through said first input optical fiber to each of said first and second intermediate optical fiber segments.

9. The switch of claim 1, wherein polarizations of light traveling through said first and second intermediate optical fibers are independent of said means for altering said difference between said first and second optical path lengths.

10. A fiber optic switch comprising:
    a) first and second input optical fibers;
    b) first and second intermediate optical fiber segments having first and second optical path lengths, respectively;
    c) first and second output optical fibers;
    d) a first optical coupler coupling said first and second input optical fibers with said first and second intermediate optical fiber segments;
    e) a second optical coupler coupling said first and second intermediate optical fiber segments with said first and second output optical fibers;
    f) a means for increasing said first optical path length by an amount d, said means for increasing comprising a first piezo-electric plate attached to said first intermediate optical fiber segment; and
    g) a means for decreasing said second optical path length by said amount d, said means for decreasing comprising a second piezo-electric plate attached to said second intermediate optical fiber segment, wherein $d_1+d_2$ is an increase in the difference between the first optical path length and the second optical path length, and wherein a change in the first optical path length due to heat deposited in the first intermediate optical fiber segment by the first piezo-electric plate is compensated a change in the second optical path length due to heat deposited in the second intermediate optical fiber segment by the second piezo-electric plate.

11. The switch of claim 10, wherein said first and second intermediate optical fiber segments lie substantially in a plane.

12. The switch of claim 10 wherein said amount d is equal to one quarter of a wavelength of light input to said first optical coupler through at least one of said input optical fibers.

13. The switch of claim 10, further comprising first and second sheaths surrounding said first and second intermediate fiber segments, respectively, wherein the first piezo-electric plate is attached to said first sheath, and the second piezo-electric plate is attached to the second sheath.

14. The switch of claim 10, further comprising a means for producing a strain in said second intermediate optical fiber segment, for producing an offset in said difference between said first and second optical path lengths.

15. The switch of claim 10, wherein said first and second intermediate optical fiber segments are annealed.

16. The switch of claim 10 wherein said difference between said first and second optical path lengths causes light entering said second optical coupler from said first intermediate optical fiber segment to selectively interfere with light entering said second optical coupler from said second intermediate optical fiber segment, whereby said second optical coupler selectively supplies a major portion of light input from the first input optical fiber to either the first or the second output optical fiber.

17. The switch of claim 10, wherein said first optical coupler couples 50% of light input through said first input optical fiber to each of said first and second intermediate optical fiber segments.

18. The switch of claim 10, wherein polarizations of light traveling through said first and second intermediate optical fibers are independent of said means for increasing said first optical path length and said means for decreasing said second optical path length.

* * * * *